United States Patent
Pollock et al.

(10) Patent No.: US 10,809,076 B2
(45) Date of Patent: Oct. 20, 2020

(54) ACTIVE DRIVING MAP FOR SELF-DRIVING ROAD VEHICLE

(71) Applicant: USHR, INC., Livonia, MI (US)

(72) Inventors: Richard Pollock, Ontario (CA); Brendan Betke, Thornbury (AU)

(73) Assignee: USHR, INC., Livonia, MI (US)

( * ) Notice: Subject to any disclaimer, the term of this patent is extended or adjusted under 35 U.S.C. 154(b) by 310 days.

(21) Appl. No.: 15/887,495

(22) Filed: Feb. 2, 2018

(65) Prior Publication Data

US 2018/0224289 A1    Aug. 9, 2018

Related U.S. Application Data

(60) Provisional application No. 62/454,379, filed on Feb. 3, 2017.

(51) Int. Cl.
*G01C 21/34* (2006.01)
*G05D 1/00* (2006.01)
(Continued)

(52) U.S. Cl.
CPC ......... *G01C 21/3407* (2013.01); *B60W 40/06* (2013.01); *G01C 21/32* (2013.01);
(Continued)

(58) Field of Classification Search
CPC ..... G01C 21/3407; G01C 21/32; G06F 16/29; B60W 40/06; B60W 10/04; B60W 10/20;
(Continued)

(56) References Cited

U.S. PATENT DOCUMENTS

| 8,190,322 B2* | 5/2012 | Lin | G07C 5/008 |
| | | | 701/31.5 |
| 8,818,696 B2* | 8/2014 | Klooster | G08G 5/0034 |
| | | | 701/120 |

(Continued)

FOREIGN PATENT DOCUMENTS

| CA | 2917511 | 1/2017 |
| CN | 201610021918.3 | 1/2017 |

(Continued)

OTHER PUBLICATIONS

U.S. Appl. No. 15/802,116, filed Nov. 2, 2017, Pollock.

*Primary Examiner* — Tuan C To
(74) *Attorney, Agent, or Firm* — Squire Patton Boggs (US) LLP

(57) ABSTRACT

A self-driving road vehicle stores an active driving map that includes a data store of route feature data together with a software or control system that periodically selects from the data store and provides to systems on the vehicle the route feature data that are relevant to the vehicle location and the route that the vehicle is following. The route feature data may include a sequential series of road cross-section data objects that represent a real-world roadway being traversed by the vehicle. Methods for operating the self-driving road vehicle include providing route feature data from an active driving map, which may include the sequential series of road cross-section data objects that represent the real-world roadway being traversed.

27 Claims, 7 Drawing Sheets

(51) Int. Cl.
*B60W 40/06* (2012.01)
*G05D 1/02* (2020.01)
*G01C 21/32* (2006.01)
*G09B 29/10* (2006.01)
*G06F 16/29* (2019.01)
*B60W 10/04* (2006.01)
*B60W 10/20* (2006.01)

(52) U.S. Cl.
CPC .......... *G05D 1/0088* (2013.01); *G05D 1/0274* (2013.01); *G06F 16/29* (2019.01); *G09B 29/106* (2013.01); *B60W 10/04* (2013.01); *B60W 10/20* (2013.01); *G05D 2201/0213* (2013.01)

(58) Field of Classification Search
CPC ............... G05D 1/0088; G05D 1/0274; G05D 2201/0213; G09B 29/106
USPC .......................................................... 701/25
See application file for complete search history.

(56) References Cited

U.S. PATENT DOCUMENTS

| | | | | |
|---|---|---|---|---|
| 8,825,226 | B1* | 9/2014 | Worley, III | H04W 4/021 |
| | | | | 701/2 |
| 8,836,490 | B2* | 9/2014 | Silzer, Sr. | G05D 1/0278 |
| | | | | 340/426.12 |
| 9,285,805 | B1* | 3/2016 | Pollock | G05D 1/0212 |
| 9,494,942 | B1 | 11/2016 | Montemerlo et al. | |
| 9,568,916 | B2 | 2/2017 | Pollock | |
| 9,836,058 | B2 | 12/2017 | Pollock | |
| 9,933,781 | B1* | 4/2018 | Bando | B60W 10/06 |
| 2011/0087715 | A1* | 4/2011 | Martens | G01C 21/32 |
| | | | | 708/200 |
| 2011/0098922 | A1 | 4/2011 | Ibrahim | |
| 2012/0158286 | A1* | 6/2012 | Nowak | G01C 21/26 |
| | | | | 701/410 |
| 2012/0254226 | A1* | 10/2012 | Shaw | G06F 16/9537 |
| | | | | 707/769 |
| 2014/0095062 | A1* | 4/2014 | Wang | G01C 21/32 |
| | | | | 701/409 |
| 2014/0156133 | A1* | 6/2014 | Cullinane | B60R 16/023 |
| | | | | 701/23 |
| 2014/0244154 | A1* | 8/2014 | Modica | G01C 21/005 |
| | | | | 701/410 |
| 2016/0252904 | A1 | 9/2016 | Sakai et al. | |
| 2016/0283804 | A1 | 9/2016 | Furman et al. | |
| 2017/0059352 | A1* | 3/2017 | Bekkerman | G01C 21/3694 |
| 2018/0209801 | A1* | 7/2018 | Stentz | G05D 1/0274 |

FOREIGN PATENT DOCUMENTS

| | | |
|---|---|---|
| EP | 1498694 | 1/2005 |
| EP | 2195613 | 6/2010 |
| WO | WO2009/045096 | 4/2009 |

* cited by examiner

ACTIVE DRIVING MAP FOR SELF-DRIVING ROAD VEHICLE

TECHNICAL FIELD

The present disclosure relates to roadway models, and more particularly to provision of an active driving map for self-driving and assisted-driving road vehicles.

BACKGROUND

Self-driving road vehicles can travel autonomously on a roadway without human intervention, and can at least autonomously maintain lane/road position while avoiding collisions. In some cases, a self-driving road vehicle can also independently navigate along a series of roadways from an initial position to a destination without human intervention; these types of self-driving road vehicles are referred to as "automatic-driving road vehicles". In other cases, referred to as "assisted-driving road vehicles", although the self-driving road vehicle can autonomously maintain lane/road position while avoiding collisions, and may also perform some additional driving tasks autonomously, the navigation tasks must be performed by a human operator. Assisted-driving vehicles may be considered to have a more sophisticated form of cruise control. For example, an assisted-driving road vehicle could maintain a constant speed (subject to speed reduction for collision avoidance) within a given highway lane indefinitely, but it would be up to a human operator to take manual control of the vehicle and navigate off the highway at the appropriate exit. The term "self-driving road vehicle", as used herein, refers to road vehicles that can at least autonomously maintain lane/road position while avoiding collisions, and encompasses both assisted-driving road vehicles and automatic-driving road vehicles.

Self-driving road vehicles rely on an array of sensors and a roadway model representing features of the roadway on which the road vehicle is travelling. The roadway model is derived from survey data of the roadways (e.g., point clouds, geo-referenced images) acquired on an earlier date. The control system, typically incorporating an onboard computer, uses the sensors to obtain data about the environment. Useful information is then extracted from these sensor data by computing hardware and software. The information obtained from the sensors can then be used in conjunction with the roadway model to perform navigation or other autonomous driving functions, including directing the road vehicle along the roadway toward a destination, compliance with traffic signals, speed limits and other legal requirements, and avoiding collisions with pedestrians and other vehicles.

SUMMARY

The present disclosure describes a self-driving road vehicle which stores an active driving map (ADM). An ADM is comprised of a data store of route feature data together with a software system that periodically selects from the data store and provides to software systems on the vehicle those route feature data that are relevant to the vehicle location and the route that the vehicle is following. The route feature data may include a sequential series of road cross-section data objects representing a real-world roadway being traversed by the self-driving road vehicle. A method of operating a self-driving road vehicle includes providing to the self-driving road vehicle route feature data from an active driving map, which may include a sequential series of road cross-section data objects representing a real-world roadway being traversed by the self-driving road vehicle.

A self-driving road vehicle comprises a body, a locomotion system, a steering system, a sensor array and a control system. The locomotion system is coupled to the body for accelerating, propelling and decelerating the vehicle along a roadway, the steering system is coupled to the body for steering the vehicle, and the sensor array is carried by the body for sensing driving data. The control system is also carried by the body. The control system is coupled to the sensor array for receiving sensed driving data from the sensor array, the control system is coupled to the locomotion system for controlling the locomotion system, and the control system is coupled to the steering system for controlling the steering system.

In one aspect, a self-driving road vehicle as outlined above includes an active driving map system that is accessible by the control system. The active driving map system has route feature data to provide to the control system. The route feature data includes, for a plurality of road segments and a plurality of road intersections of a real-world roadway, a sequential series of road cross-section data objects corresponding to the real-world roadway. Each road cross-section data object comprises a side-to-side cross-sectional description of a road surface at a specific location on the real-world roadway.

In another aspect, a method of operating a self-driving vehicle comprises providing, to the control system of the self-driving vehicle, from an active driving map system accessible by the control system, route feature data including, for a plurality of road segments and a plurality of road intersections of a real-world roadway, a sequential series of road cross-section data objects corresponding to the real-world roadway, wherein each road cross-section data object comprises a side-to-side cross-sectional description of a road surface at a specific location on the real-world roadway.

The active driving map system may include a server process to receive position, orientation, and motion measurement data for the vehicle, and each road cross-section data object ahead of the vehicle may have a driving distance to that road cross-section data object from the vehicle.

The active driving map system may also have road connection data objects and/or road object data objects to provide to the control system.

In some embodiments, each of the sequential series of road cross-section data objects is defined by a notional plane perpendicular to a surface of the roadway. Each of the sequential series of road cross-section data objects may include a position and an orientation.

In a further aspect, a self-driving road vehicle as outlined above includes an active driving map system accessible by the control system. The active driving map system has route feature data to provide to the control system, and the active driving map system comprises a server process communicatively coupled to at least one client process.

In some embodiments of the various aspects of the present disclosure, the control system may comprise at least one controlling client process coupled to the server process of the active driving map system and adapted to configure the behavior of the server process, wherein each controlling client process is mutually non-interfering with each other controlling client process. In particular embodiments, the control system comprises only a single controlling client process.

The control system may comprise at least one passive client process coupled to the server process of the active driving map system and adapted to receive route feature data from the server process.

In some embodiments of each of the aspects described herein, the active driving map system is accessible by the control system because the control system executes the server process of the active driving map system.

In another aspect, a self-driving vehicle as outlined above includes an active driving map system accessible by the control system and having route feature data to provide to the control system, wherein the route feature data includes a sequential series of road cross-section data objects corresponding to a real-world roadway.

BRIEF DESCRIPTION OF THE DRAWINGS

These and other features of the invention will become more apparent from the following description in which reference is made to the appended drawings wherein.

DETAILED DESCRIPTION

Figure 1A:
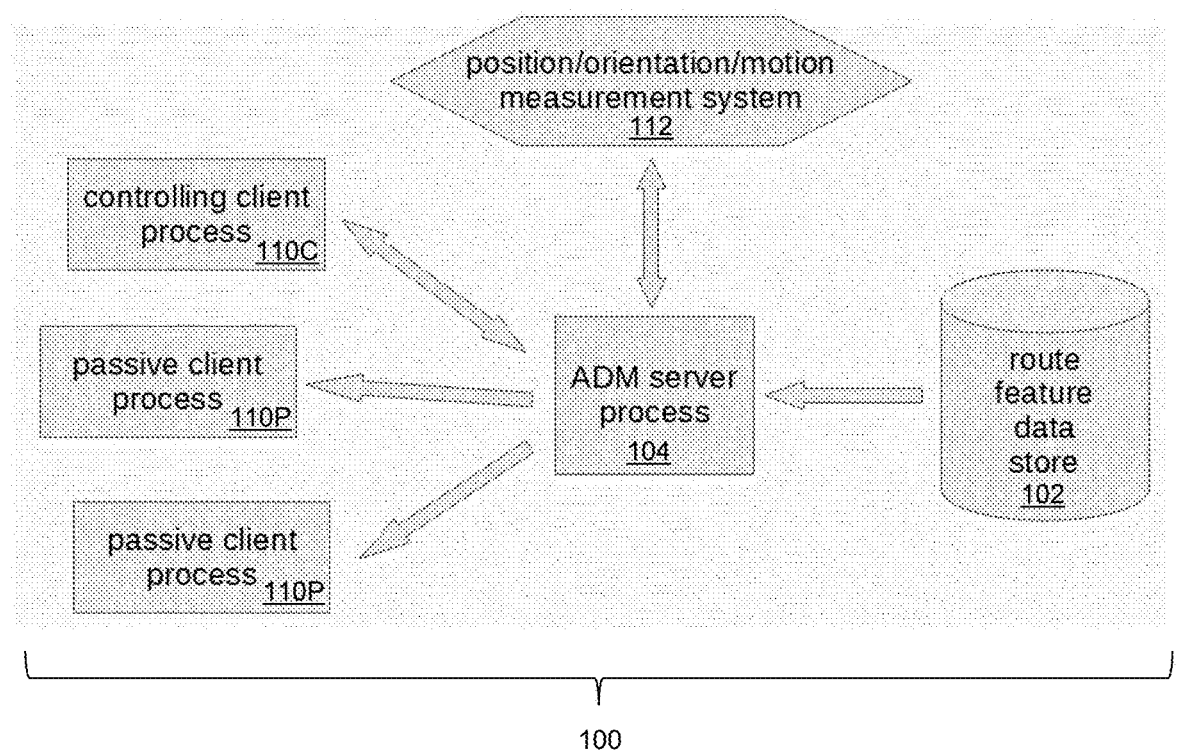
FIG. 1A shows, in schematic form, the software process and data components of an exemplary implementation of an ADM system and its relation to other software processes on a vehicle.

Reference is now made to FIG. 1A, which shows, in schematic form, the software process and data components of an exemplary implementation of an active driving map (ADM) system and its relation to other software processes on the vehicle, indicated generally by reference 100. The ADM portion of the illustrated overall system 100 comprises a route feature data store 102, a server program/process 104 and software components that are incorporated into the implementation of the client programs/processes 110C, 110P that communicate with the ADM server process 104 and consume route feature data.

Figure 1B:
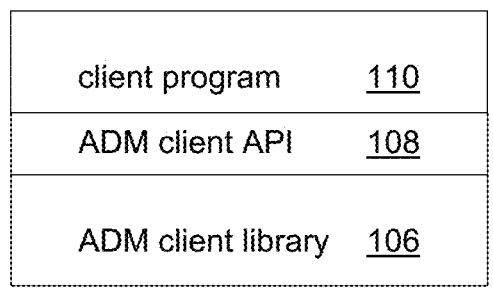
FIG. 1B shows, in schematic form, the organization of an exemplary on-vehicle software program that is implemented to use route feature data provided by the ADM.

As shown in FIG. 1B, an ADM client library 106 and an ADM application programming interface (API) 108 are provided to facilitate the implementation of client processes that communicate with the ADM server process 104 and consume route feature data. The use of a client-server configuration, with client library 106 and API 108 supplied, provides a way to integrate the active driving map into a broader automatic driving system.

The server process 104 (the executing server program) communicates with one or more client processes 110C, 110P (the executing client programs). In one embodiment, the server/client communication mechanism is Transmission Control Protocol (TCP) although other suitable communication mechanisms can also be used. The server process 104 provides to the client processes 110C, 110P periodically updated data on the vehicle's immediate context and on the road extending ahead of the vehicle. The data originate from the route feature data store 102. At least one of the client processes is a controlling client process 110C capable of sending parameter values to the server process 104 to configure its behavior and other client processes 110P are passive client processes which can receive information from the server process 104 but cannot configure its behavior. While only a single controlling client process 110C is shown in FIG. 1A, it is contemplated that there may be a plurality of controlling client processes as long as each controlling client process is mutually non-interfering with each other controlling client process, that is, does not provide conflicting instructions to the server process 104. In the preferred embodiment shown in FIG. 1A, exactly one client process 110C is a controlling client process and it follows axiomatically that this single controlling client process 110C is non-interfering with each other controlling client process. Because there is only a single controlling client process 110C, there is no other controlling client process with which that single controlling client process 110C could interfere.

The server process 104 also communicates with a position, orientation, and motion measurement system (POMMS) 112 that provides data to the server process 104 on the position, orientation, and motion of the vehicle. Preferably, the POMMS 112 provides this data at a frequency of at least 10 Hz (ten times per second). The POMMS 112 is not part of the ADM and its design is independent of the ADM. Preferably, the POMMS 112 provides global position data at a sub-meter absolute accuracy. The POMMS 112 may be any suitable system/device or combination of system(s)/device(s). For example, the POMMS 112 may simply be a coupled GNSS/inertial measurement device and an interface software module, or it may be more complex and use one or more of, for example, global positioning system (GPS) data, cell tower triangulation, automotive dead reckoning (ADR), and may estimate position corrections from on-vehicle azimuth and range measurements to roadway land marks with known geo-coordinates, for example using data from a small scanning LIDAR sensor. A POMMS plug-in interface may be provided for accommodating different types of POMMS devices.

In one embodiment, the server process 104 executes on an on-vehicle server computer, the route feature data store 102 resides in on-vehicle memory attached to that server computer, and client processes execute either on the server computer or on one or more other on-vehicle computers coupled (e.g. by way of an Ethernet connection) to the server computer. One such embodiment will be described below in the context of FIG. 7. In other embodiments, one or more of the server process 104, part of the POMMS 112 and the route feature data store 102 may exist on off-vehicle hardware, so long as the communication between the server process 104 and the client processes 110C, 110P, and between the necessarily on-vehicle POMMS components and the off-vehicle POMMS components, has adequate speed and security.

The route feature data stored in the route feature data store 102 describes opportunities and constraints to driving on roadways; for example, the route feature data may describe limits on the speed of the vehicle, where the vehicle can and cannot change lanes, which lanes the vehicle has to be in at certain locations in order to follow a course to a specified destination, how far ahead of the vehicle is a shoulder on which the vehicle can stop, which roads are connected to the current road, and so on. Such data, when (a) put into a consistent, orderly digital structure, stored either on or off the vehicle (in the latter case, accessible via an electronic communication channel), and (b) paired with software that can read location-relevant parts of the data from storage, may be used by a system that automatically makes driving decisions and controls the vehicle in order to implement those decisions, or may be used by a human driver if they are effectively presented to the driver (e.g., through a human/machine interface that renders the data graphically or aurally). In one exemplary embodiment, the route feature data store 102 may consist of one SQLite file and a collection of other binary files. The software functions that create the SQLite file and access data from it may incorporate the SpatiaLite extension to allow parts of the data to be formatted as, and interpreted as, spatial objects with coordinates in a terrestrial coordinate frame.

One exemplary implementation of a framework for organizing and presenting route feature data will now be described. The exemplary framework is intended to accommodate route feature data that are relevant to a variety of road types, including controlled-access highways and local roads, and represents various aspects of a road system using data objects.

For the exemplary route feature data framework, a road network is conceptualized as a connected set of road units. A road unit is either a road segment or a road intersection; the decomposition of a road network into road units is described further below. The connection between any two adjacent road units is represented by a road connection data object. The properties of each road unit are represented by sequences of road cross-section data objects and sets of road object data objects. Each road segment has a single sequence of road cross-section data objects, and each road intersection data object has one road cross-section sequence for each lane. The road cross-section and road object data objects are described further below.

Many of the data objects in the route feature data framework, including the road cross-section and road object data objects, include coordinates in a common terrestrial coordinate frame. Since the spatial extent on the earth's surface of a route feature data set may be arbitrarily large, a terrestrial coordinate frame that covers the entire earth is advantageous for this purpose; for example, WGS84 (G1150) geodetic latitude, longitude, and height.

The exemplary route feature data framework also uses the concept of a route to represent a sequence of connected road units that join an origin location and a destination location; optionally a data structure may be provided to represent a route. The origin location is within the horizontal extent, or envelope, of the first road unit data structure in the sequence and the destination location is within the envelope of the last road unit data structure in the sequence ("envelopes" for road segment and road intersection data structures, respectively, are described further below). A route is a sequence of connected road units that can be continuously driven (allowing for regulation stops along the way). In exemplary implementations, a route can be defined using a variety of suitable techniques. For example, in some embodiments a route can be defined as:
 a most probable path of the vehicle, for example the maximum-length sequence of connected road units that extend ahead of the vehicle in which all road segments have the road name of the road segment currently occupied by the vehicle; or
 a sequence of connected road units that correspond to a sequence of waypoints (a waypoint is a WGS84 latitude and longitude coordinate pair or WGS84 latitude, longitude, and height coordinate triplet that lies on the route).

The controlling client process 110C is responsible for choosing the method for defining the route and communicating the choice to the server process 104. In the case of the second method, the controlling client process 110C is also responsible for providing the sequence of waypoints, which are sent to the server process 104. The first method is appropriate for some instances of long-distance driving (e.g., following the same interstate highway for several hours). The second method is based on the assumption that a separate route planning system is available, and that the controlling client process 110C can obtain a waypoint sequence from that system. Navigation and route planning systems for road vehicles are well developed and are coupled with extensive databases that are commercially maintained or, in some cases, adapted from "crowdsourced" map data. The presently described systems and methods accommodate a loose coupling (e.g. via waypoints exchange or rule exchange) between an existing route planning system and the ADM system (for example, the navigation system could be coupled to the controlling client process) rather than implementing a route planning system as part of the ADM system; in alternate embodiments an ADM system may incorporate a route planning system. If in the second method the waypoints are very widely-spaced (in the extreme case, the sequence may consist of only of a start waypoint and an end waypoint), then it is possible that multiple different routes may match the waypoint sequence. In one embodiment, in such instances the ADM system may select the shortest (in terms of driving distance) of these routes.

The active driving map system 100 provides to the client processes 110C, 110P lists of road connection, road cross-section, and road object data objects that apply to the present route from the current vehicle location up to some specified driving distance ahead of the vehicle along the route. These lists are updated as the vehicle drives along the route. Additionally, the active driving map system 100 provides a periodically updated vehicle context data object, which provides vehicle-centered data such as the vehicle position, speed, heading, and lateral position within the occupied lane. The calculation of a route is described further below.

As noted above, in the exemplary embodiment a road unit may be either a road segment or a road intersection, each of which comprises a fixed number of driving paths. The term "driving path", as used in this context, refers to a driving lane, dedicated parking lane, turn lane, shoulder, or any other longitudinally extending strip within the roadway that is delineated by an implied or physically marked boundary (referred to as a "delineator") and within which a vehicle can physically (even if not legally) drive. A physical boundary marking can be driven over by any road vehicle, even if road regulations indicate that it should not be, and is typically formed with paint, a surface material change (e.g., from asphalt to gravel), or low-height structures such as reflectors or Botts' dots. An implied boundary may be, for example, the unmarked widthwise midpoint of a road (such as a residential road) which lacks any road markings. Driving lanes, dedicated parking lanes and turn lanes can all be characterized by the broad descriptor "lanes", as distinguished from shoulders.

Figure 2A:
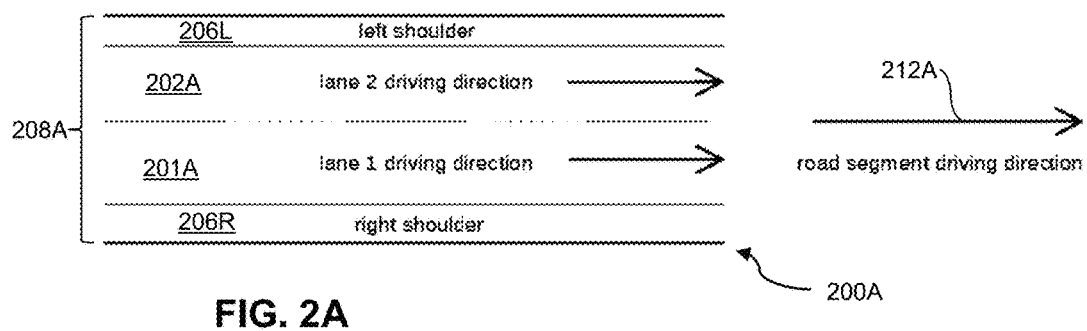
FIGS. 2A to 2C show, in schematic form, the assignment of driving paths and driving direction to road segments.
Figure 2B:
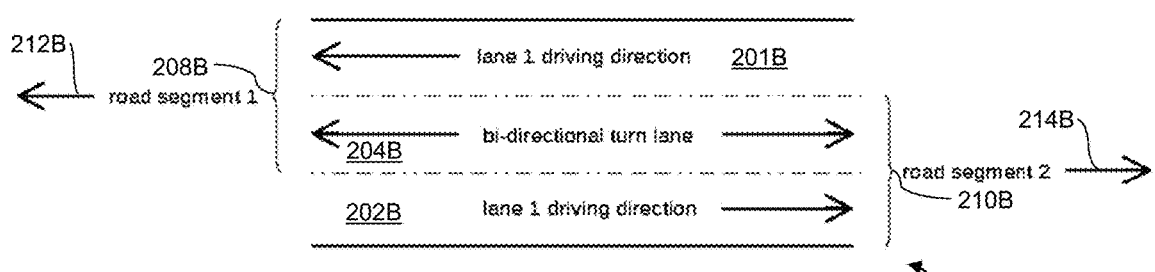
Figure 2C:
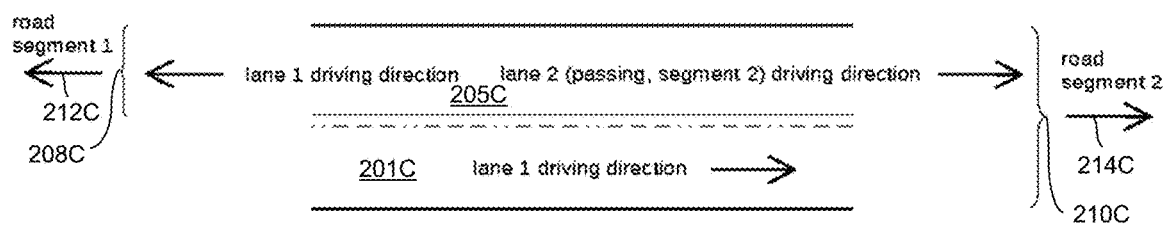

Referring now to FIGS. 2A to 2C, a road segment consists of a fixed number of driving paths. For each road segment, there will be one or more lanes (where there is more than one lane, the lanes will be parallel and adjacent), and the number of shoulders may be zero, one, or two. Two adjacent driving paths (adjacent lanes or an outside lane and adjacent shoulder) share an implied or physically marked boundary. The outermost edge of a shoulder or outermost lane where there is no shoulder is also an implied or physically marked boundary. A road segment has a single driving direction.

In the simplest case, as shown in FIG. 2A, all the lanes, namely lane 1 (201A) and lane 2 (202A) in the roadway (200) represented by the road segment 208A have the same constant driving direction 212A, which is then also the road segment driving direction. Examples of such a roadway include a one-way street, or one side of a divided highway, each of which could be represented by a single series of road segments. The roadway 200 shown in FIG. 2A also includes a left shoulder 206L and a right shoulder 206R A bi-directional street, with or without markings, would be represented by two parallel road segments with opposite driving directions. In this case, a road segment may include one lane that is also part of the opposing road segment. For example, as shown in FIG. 2B, roadway 200B includes a first lane 1 (201B) having a first driving direction, a second lane 1 (202B) having a second driving direction opposite the first driving direction, and a bi-directional turning lane 204B which is simultaneously part of two overlapping road segments 208B, 210B with respective opposing driving directions 212B, 214B. The same approach could be used for a reversible lane.

Another example of a lane that may simultaneously be part of two parallel road segments with opposite driving directions is a passing lane. FIG. 2C includes a roadway 200C that has a passing lane 205C and an ordinary lane 201C. As shown in FIG. 2C, a lane 205C that is a passing lane (lane 2) for one road segment 210C and a non-passing lane (lane 1) for the other road segment 208C has two roles (passing and non-passing). In its role as an ordinary lane (lane 1 of the single-lane road segment 208C) it has a driving direction 212C and as a passing lane (lane 2 of the two-lane road segment 210C), the lane 205C has a driving direction 214C matching that of the other lanes in the two-lane road segment 210C and opposite the driving direction 212C of the single-lane road segment 208C.

In the exemplary embodiment, each lane in a road segment is identified by an ordinal value. In right-hand traffic jurisdictions, as can be seen in FIGS. 2A to 2C, the lane that is furthest starboard of a vehicle when the vehicle is pointed in the road segment's driving direction has ordinal value 1 (i.e., is "lane 1"), the lane next to lane 1 is lane 2, the lane next to lane 2 on the opposite side of lane 1 is lane 3, and so on. In left-hand traffic jurisdictions, the lane that is furthest port of a vehicle when the vehicle is pointed in the road segment's driving direction has ordinal value 1 (i.e., is "lane 1"), the lane next to lane 1 is lane 2, the lane next to lane 2 on the opposite side of lane 1 is lane 3, and so on.

As shown in FIG. 2A, a road segment shoulder is a right shoulder (206R) if it is starboard of a vehicle that occupies a lane of that road segment (208A) and is pointed in the road segment's driving direction. A road segment shoulder is a left shoulder (206L) if it is port of a vehicle that occupies a lane of that road segment (208A) and is pointed in the road segment's driving direction.

Figure 3:
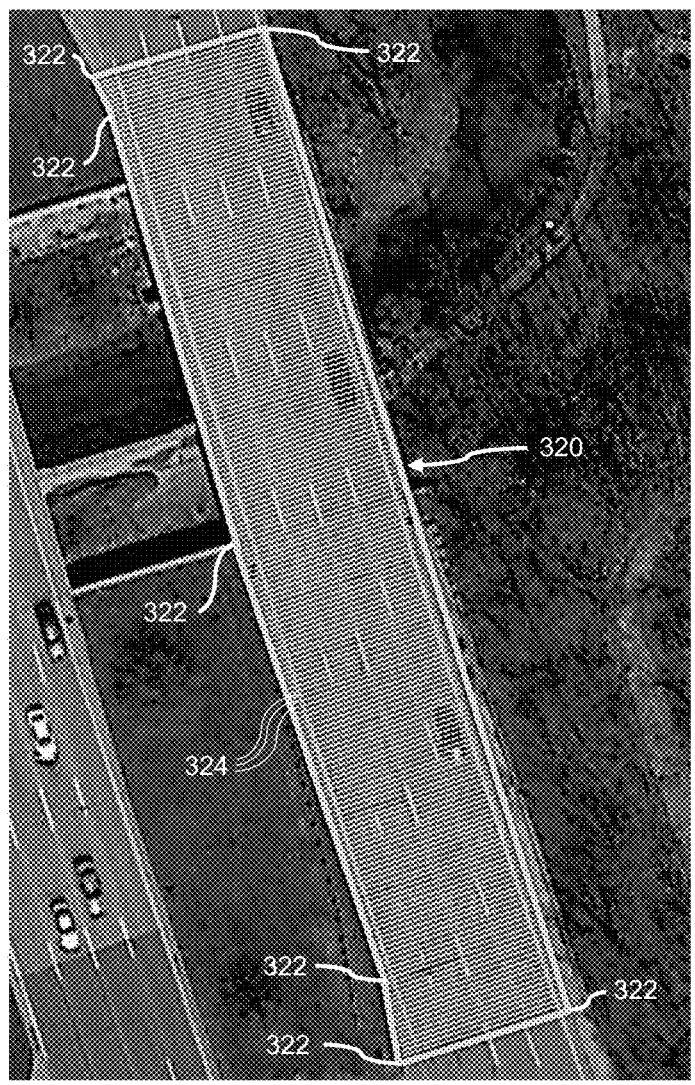
FIG. 3 shows an exemplary road segment.

Referring now to FIG. 3, the envelope of a road segment is defined by the left and right road delineators along the length of the road segment and a cross-segment boundary at each end. This is represented and stored as a polygon 320 whose vertices 322 are 2D (horizontal) terrestrial coordinates. The delineators may be the outer boundaries of the shoulders, or of the outermost lane where there is no shoulder.

Figure 4:
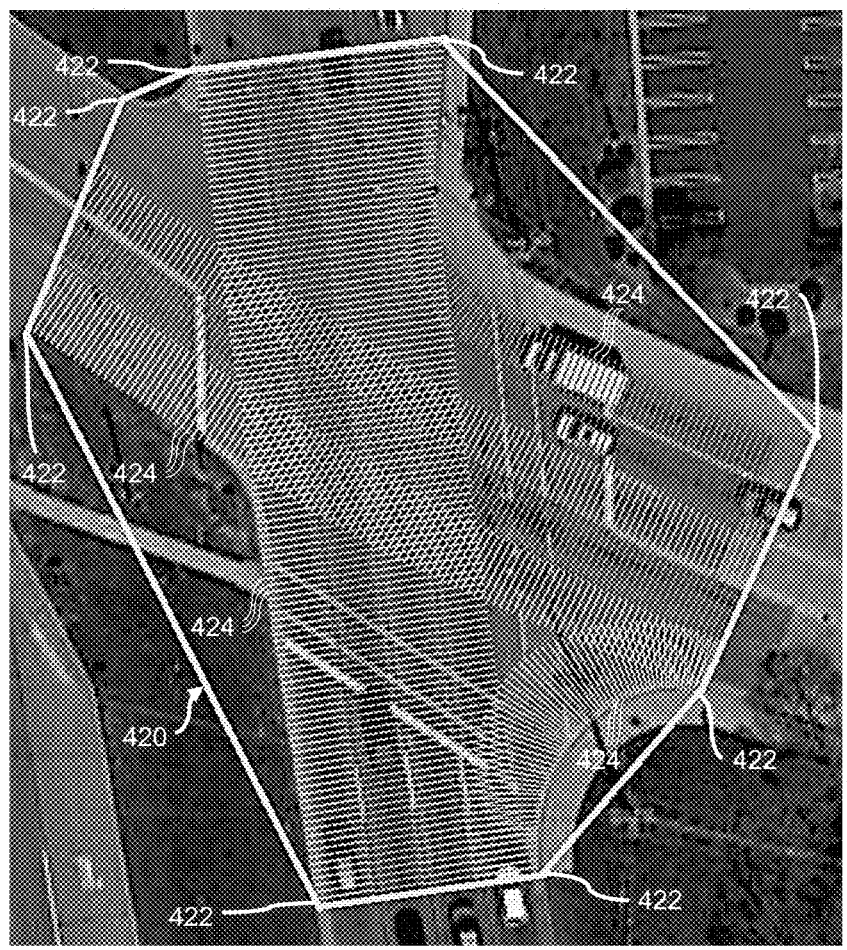
FIG. 4 shows an exemplary road intersection.

Reference is now made to FIG. 4. A road intersection consists of a fixed number of driving paths (lanes) but, unlike road segments, at least two of those lanes cross over one another. The number of lanes is two or more. Each lane in a road intersection has two implied or physically marked boundaries. Each lane in a road intersection has an integer identifier that is unique within that intersection. The identifier values begin at 1 and end at the number of lanes in the intersection. An intersection lane's identifier value need not indicate any spatial order of the lane within the intersection. In the exemplary embodiment, the envelope of a road intersection is the horizontal convex hull of the boundaries of all the constituent lanes. This is represented and stored as a polygon 420 whose vertices 422 are 2D (horizontal) terrestrial coordinates. In alternate embodiments, the spatial union of the lanes may be used as the envelope.

As indicated above, a road network is conceptualized as a connected set of road units, i.e. road segments and road intersections, and any arbitrary road network may be decomposed into road segments and road intersections. In the exemplary implementation, road segment boundaries are defined at least (a) at a road intersection; and (b) where the number of lanes or shoulders in the road represented by that road segment changes. The interface between a road segment and an intersection is in advance of sharply curving road boundaries.

Figure 5A:
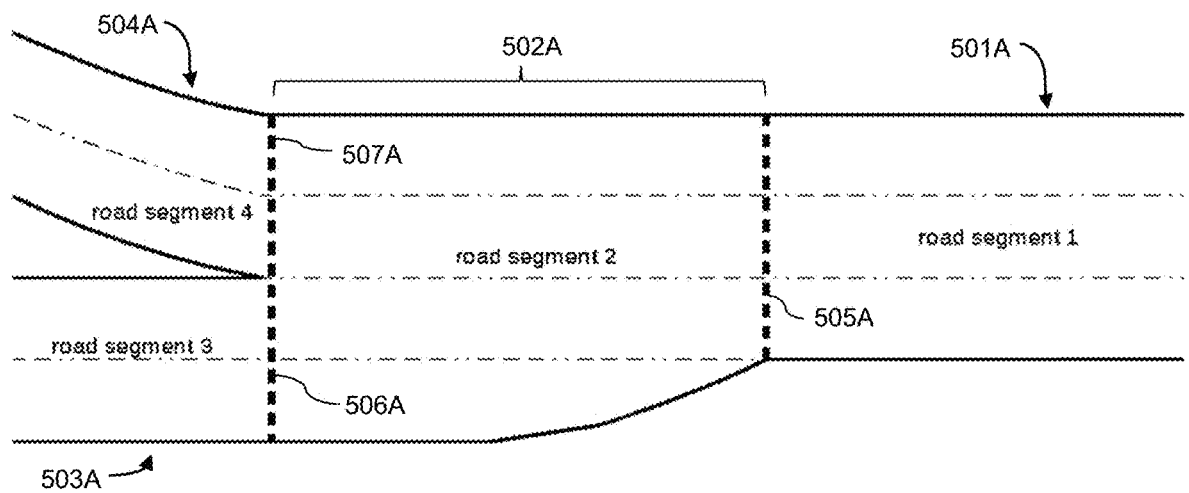
FIGS. 5A and 5B show exemplary instances of decomposition of a roadway into road units (road segments and road intersections)
Figure 5B:
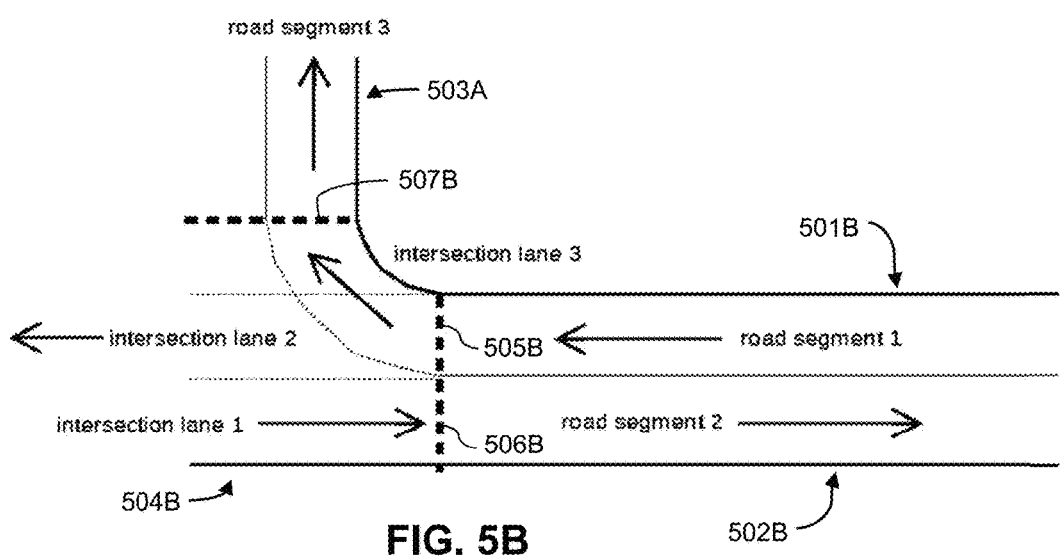

With reference now to FIGS. 5A and 5B, exemplary instances of decomposition of a roadway into road units will be illustrated. In FIG. 5A, boundaries are defined between road segments because the number of lanes change. A boundary 505A is defined between road segment 1 (501A) and road segment 2 (502A) because road segment 1 (501A) has three lanes and road segment 2 (502A) has four lanes. Boundaries 506A, 507A, respectively, are defined between road segment 2 (502A) and road segment 3 (503A), and between road segment 2 (502A) and road segment 4 (504A), because road segment 2 (502A) has four lanes and road segment 3 (503A) and road segment 4 (50A4) each have two lanes. In FIG. 5B, boundaries 505B, 506B and 507B are defined between road segments 501B, 502B, 503B and an intersection 504B. More particularly, a first boundary 505B is defined between road segment 1 (501B) and lanes 2 and 3 of the intersection 504B, a second boundary 506B is defined between road segment 2 (502B) and lane 1 of the intersection 504B and a third boundary 507B is defined between road segment 3 (503A) and lane 3 of the intersection 504B.

Optionally, additional criteria may be imposed to define where a road segment ends and another begins. For example, road segments may be bounded where the speed limit for any of the lanes changes, or at arbitrary intervals. This may be convenient to do depending on the tools and procedures that are used to generate the route feature data objects from primary data.

In one embodiment, a road segment is defined as a maximum length stretch of road for which the following properties are constant:
road name;
road type;
number of delineators;
number of lanes;
number of shoulders;
the surface of each shoulder;
the type of each lane;

the surface of each lane; and the speed limits for each lane.

Some of the above conditions are pragmatic and support efficient feature extraction (e.g. from point cloud data) with existing software tools while still not resulting in an excessive number of road segments. It is anticipated that with future feature extraction tools, some of these conditions may be removed.

The conceptual decomposition of a road network into road segments and road intersection facilitates representation of attributes of the real-world roadways in the network using road connection, road cross-section and road object data objects. The exemplary implementation does not require data objects to represent road segments or road intersections apart from their envelopes, which may be used for route computation, although such data objects may be provided, for example as assemblies of road connection, road cross-section and road object data objects.

The road connection data object represents the mapping of driving paths (lanes and shoulders) between two connected road units (i.e. sequentially adjacent road segments or a road segment and a road intersection), data on the connected road units and the driving distance of the connection ahead of the vehicle at a particular instant (i.e. how far away from the vehicle is the connection between the two road units, measured along the current road unit). In order for two road units to share a connection (i.e. be connected by a road connection data object), at least one driving path in one road unit must be physically continuous with at least one driving path in the other road unit.

Any arbitrary road segment can be represented as a series of road cross-section data objects, with the series being sequential in the driving direction of the self-driving road vehicle driving on the real-world roadway. Similarly, any arbitrary road intersection can be represented as two or more series of road cross-section data objects, with there being one series of road cross-section data objects for each lane in the intersection.

For a road segment, each road cross-section data object contains a side-to-side cross-sectional description of the road surface (consisting of one or more lanes and zero, one or two shoulders) at a specific location, including type and geometric data for lanes, shoulders and delineators, cross-section geo-location, and the driving distance of the cross-section ahead of the vehicle at a particular instant (i.e. how far away from the vehicle is the location where the cross-section is taken, measured along the road segment). The road cross-section data object describes a cross-section that spans all the lanes and shoulders of the roadway.

Figure 6:
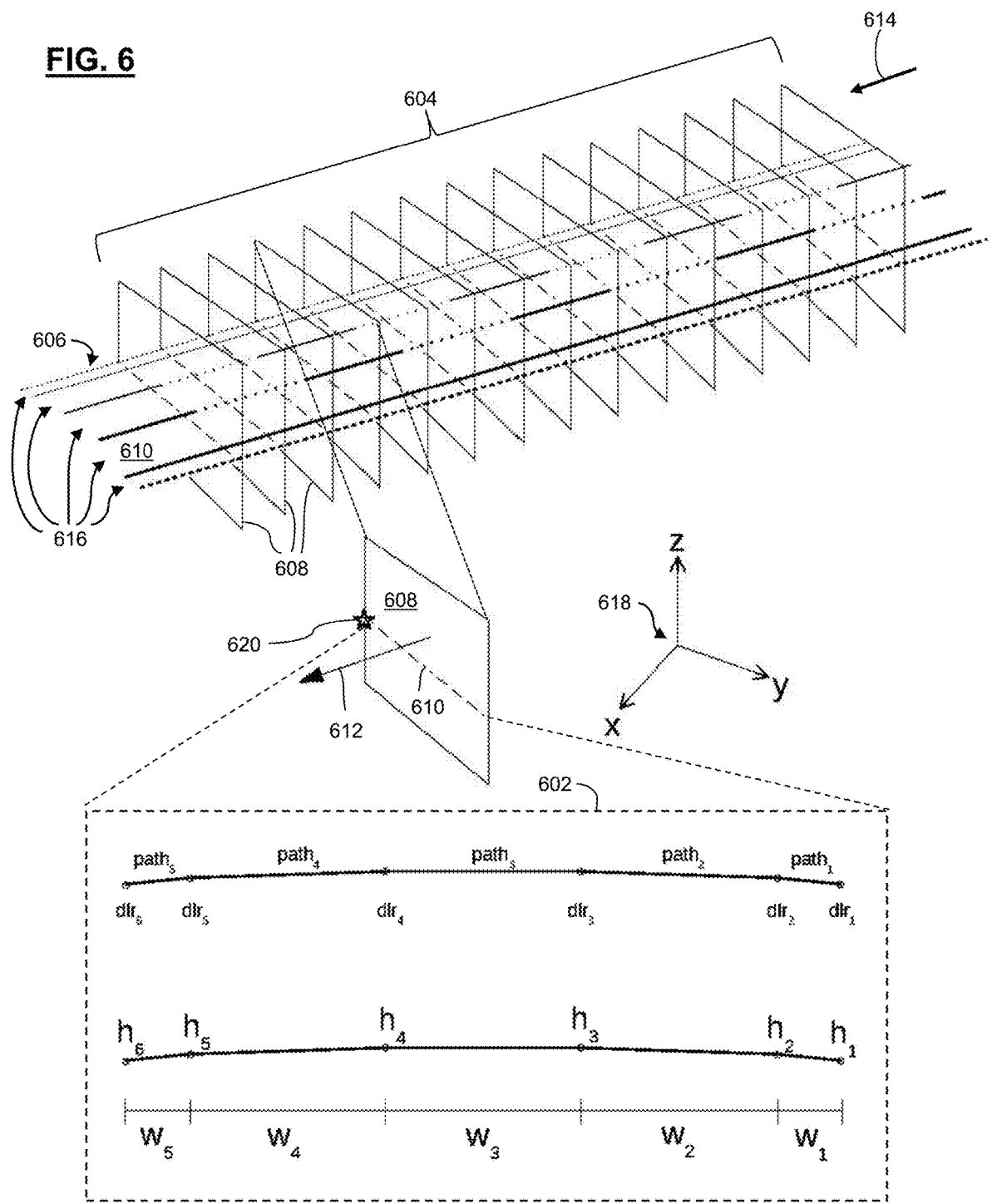
FIG. 6 schematically illustrates the concept of a road cross-section data object for a road segment.

Reference is now made to FIG. 6, which schematically illustrates the concept of a road cross-section data object for a road segment. The road cross-section data object is denoted generally by reference 602. As noted above, the ADM system 100 provides to the client processes 110C, 110P lists of road cross-section data objects 602 (as well as lists of road connection and road object data objects) that apply to the present route. As such, the ADM system provides a dynamically updated sequential series 604 of road cross-section data objects 602 representing a real-world roadway 606 being traversed by a self-driving road vehicle (not shown in FIG. 6). The series 604 of road cross-section data objects 602 is sequential in the driving direction of the self-driving road vehicle driving on the real-world roadway. Each road cross-section data object is defined by a notional plane 608 that is (a) substantially perpendicular to the road surface 610; and (b) for which a normal 612 of the notional plane 608 is substantially parallel to a nominal driving direction 614 at the particular longitudinal position on the real-world roadway and which notional plane 608 intersects the surface 610 of the real-world roadway 606 represented by that road cross-section data object 602 over an extent encompassing at least each driving path 616 on the surface 610 of the real-world roadway 606 represented by that road cross-section data object 602.

Each road cross-section data object 602 represents the surface 610 of the real-world roadway 606 at a particular longitudinal position on the real-world roadway 606, with the represented surface 610 including at least each driving path 616 (i.e. lanes and shoulders) on the real-world roadway 606. Each road cross-section data object 602 specifies both the longitudinal position of a slice of the surface 610 on the real-world roadway 606 and the orientation of that slice of the surface 610 of the real-world roadway 606 represented by that road cross-section data object 602. Position and orientation are both defined in a 3D terrestrial coordinate frame. A Cartesian coordinate frame 618 is shown (e.g., earth-centered earth-fixed, or ECEF), but it could also be a spherical coordinate frame (e.g., WGS84 lon, lat, height). The position may be defined by the position of a distinguished point 620 on the cross-section defined by the intersection of the notional plane 608 and the real-world roadway 606 such as an endpoint, and the orientation may be defined by the orientation of the normal 612 to the notional plane 608 in the nominal driving direction 614 (a plane has two normals in opposite directions), Each road cross-section data object 602 further specifies locations, relative to the terrestrial coordinate frame 618, of delineators (denoted as $dlr_1$ through $dlr_6$) defining edges of each driving path 616 (denoted as $path_1$ through $path_5$) on the surface of the real-world roadway 606 represented by that road cross-section data object 602. Preferably, each road cross-section data object 602 also specifies the height (denoted as $h_1$ through $h_6$) of the surface 610 of the real-world roadway 606 represented by that road cross-section data object 602 at each delineator $dlr_1$ through $dlr_6$ as well as the horizontal width (denoted as $w_1$ through $w_6$) between each adjacent delineator $dlr_1$ through $dlr_6$; this enables the cross-slope of each driving path 616 (i.e. $path_1$ through $path_5$) to be computed. Alternatively, the cross-slope of each driving path 616 (i.e. $path_1$ through $path_5$) may be specified directly. Thus, the present disclosure describes attachment to a road cross-section data object 602 of attributes of the delineators (e.g. $dlr_1$ through $dlr_6$) and driving paths 616 (e.g. $path_1$ through $path_5$) whose positions are indicated by the road cross-section data object 602, as well as the computation of geometric attributes of the delineators (e.g. $dlr_1$ through $dlr_6$) and driving paths 616 (e.g. $path_1$ through $path_5$) whose positions are indicated by the road cross-section data objects 602. In one preferred implementation, the geo-location of a distinguished point on the cross-section defined by the plane (e.g. the starboard endpoint at road level—see point 620 in FIG. 6) is recorded, and then the locations of the delineators are defined relative to that distinguished point as specified by a horizontal offset (sum of the lane widths to that delineator) and vertical offset. This, combined with the orientation of the cross-section allows the derivation of terrestrial coordinate frame coordinates for each delineator point on the cross section. Directly storing global terrestrial coordinate frame coordinates for each delineator point would take more space, and then lane widths would not be directly represented. The road intersection shown in FIG. 4 has lines representing the cross-section geo-locations superimposed thereon; as can be seen, each lane has its own sequence of road cross-section data objects spanning only that lane. Thus, each driving path through a roadway intersection is represented as its own roadway with its own sequential series of cross-section data objects.

The road segment shown in FIG. 3 has lines 324 representing the cross-section geo-locations superimposed thereon; as can be seen, each road segment will have a single sequence of road cross-section data objects spanning the entire road surface.

For a road intersection, each road cross-section data object contains a side-to-side cross-sectional description of the road surface at a specific location that is similar to that for a road segment, but for only a single lane. Thus, each road cross-section data object for a road intersection will specify the locations, relative to the terrestrial coordinate frame, of the two delineators defining the edges of that lane, and preferably also specifies the height of the surface of the real-world roadway at each delineator as well as the horizontal width between each adjacent delineator. The road intersection shown in FIG. 4 has lines 424 representing the cross-section geo-locations superimposed thereon; as can be seen, each road cross-section data object spans only a single lane.

For both road segments and road intersections, the lane types and delineator types may be customizable.

The road object data object is used to represent data on a discrete road object that conveys information not encoded in the other data objects. Examples of road features that may be represented by a road object data object include traffic signals, traffic regulation signs, pedestrian crossings, stop bars, speed bumps and the like; the data include the object's identity, association with a specific road unit and lane, geo-location, and position in the vehicle coordinate frame and driving distance ahead of the vehicle at a particular instant. In preferred embodiments, the road object classification is customizable.

The vehicle context data object contains vehicle-centered data for a particular instant, including, at a minimum, the vehicle's geo-location, velocity, and orientation. In preferred embodiments, the vehicle context data object also contains:
 data on the lane or shoulder that the vehicle occupies, at the vehicle location;
 the delineators (lane markings, road edges, shoulder markings) adjacent to the vehicle and the vehicle horizontal distance to the adjacent delineators (or to one of the adjacent delineators);
 the vehicle localization mode and correction type;
 data on the road unit (road segment or intersection) that the vehicle occupies (identifier, road name, road type); and
 time of day.

The local time of day may, for example, be computed using UTC time in combination with vehicle position and time zone polygons stored in the route feature data store 102, or may be communicated as UTC for conversion by the client process 110C, 110P into local time.

In an exemplary implementation using C++, the road connection, road cross-section and road object data objects may be represented as structs. In this exemplary implementation, the data object structs are hierarchical. At the bottom level of each hierarchy are terminal (i.e., without descendants) struct declarations that incorporate enum declarations named "Type". Each identifier in these Type enumeration lists represents, for the purpose of driving a road vehicle, one specific real-world physical object or configuration rather than an abstract class of multiple related real-world physical objects or configurations. As such, these identifiers are referred to as terminal identifiers. For example, for lane delineators, the terminal identifier may specify whether the delineator is (e.g.) a solid paint line, a broken paint line, a solid paint line beside a broken paint line, Bott's dots, etc. The set of terminal identifiers can be modified to suit particular requirements. For example, to support a landmark-based localization correction system, a road object corresponding to vertical posts (e.g., sign posts) or vertical edges (e.g., at entrances to overpasses) may be added; these objects may be extracted both from the point cloud data that are used to generate the stored route feature data, and from LIDAR scanner data acquired from a vehicle. Road objects that represent potential vehicle collision locations in intersections (where paths through the intersection cross) may also be accommodated. The design of suitable structs, hierarchies and declarations is within the capability of one skilled in the art, now informed by the present disclosure.

Where C++ is used, an ADM client program may incorporate an instance of an ADM C++ class (there may be one such class for passive client processes 110P and another for the controlling client processes 110C) implemented in the ADM client library 106. This object handles all communication with the ADM server and provides route feature data objects (i.e. the road connection, road cross-section and road object data objects) to the client as instances of C++ structs. These data objects are designed to be directly usable by the client software, to relieve developers of client software from having to implement data decoding and reformatting software.

Lists of road connection, road object, and road cross-section data objects are provided to client processes. These lists hold the data objects of their respective types that represent the roadway from the vehicle location to a specific driving distance ahead of the vehicle along a specific route. The road cross-section list holds objects at a specified distance interval (e.g., every meter). The driving distance ahead of the vehicle that is covered by the data object lists, and the interval between road cross-sections, are server process parameters that can be changed by the controlling client process with calls of certain methods in the C++ class for the controlling client process 110C. The interval between road cross-sections can be set to any integer multiple of the intervals at which the road cross-section data is available. An algorithm may be used for computing the placement of the cross-section data objects within each series from the roadway boundaries; the data can be extracted from point cloud data.

A new vehicle context instance and revised road connection, road object, and road cross-section lists are provided to a client process 110C, 110P (e.g. executing on a computer system of a self-driving road vehicle) for each position/orientation/motion measurement from the POMMS 112 (preferably at least 10 times a second). Thus, a dynamically updated sequential series of road cross-section data objects representing a real-world roadway being traversed by a self-driving road vehicle may be provided to that self-driving road vehicle. Driving distance and vehicle coordinate frame position data that are contained in individual data objects are current to the last POMMS measurement. The local time-of-day of the POMMS measurement to millisecond resolution is associated with each driving distance and vehicle-coordinate frame position. An estimate of the time between the POMMS measurement and the receipt of the related update by the client (i.e., data latency) is also provided.

A client program registers a callback function with the object that handles all communication with the ADM server, and that object calls the function at every update with the new vehicle context instance and the updated road connection, road object, and road cross-section lists. The ADM client library may also include a set of utility functions that support the identification of listed data objects that satisfy certain criteria. For example, in a malfunction situation it would be desirable to identify the closest run of road cross section objects that show a right shoulder that is wide and flat enough to be an emergency pull-over.

Figure 7:
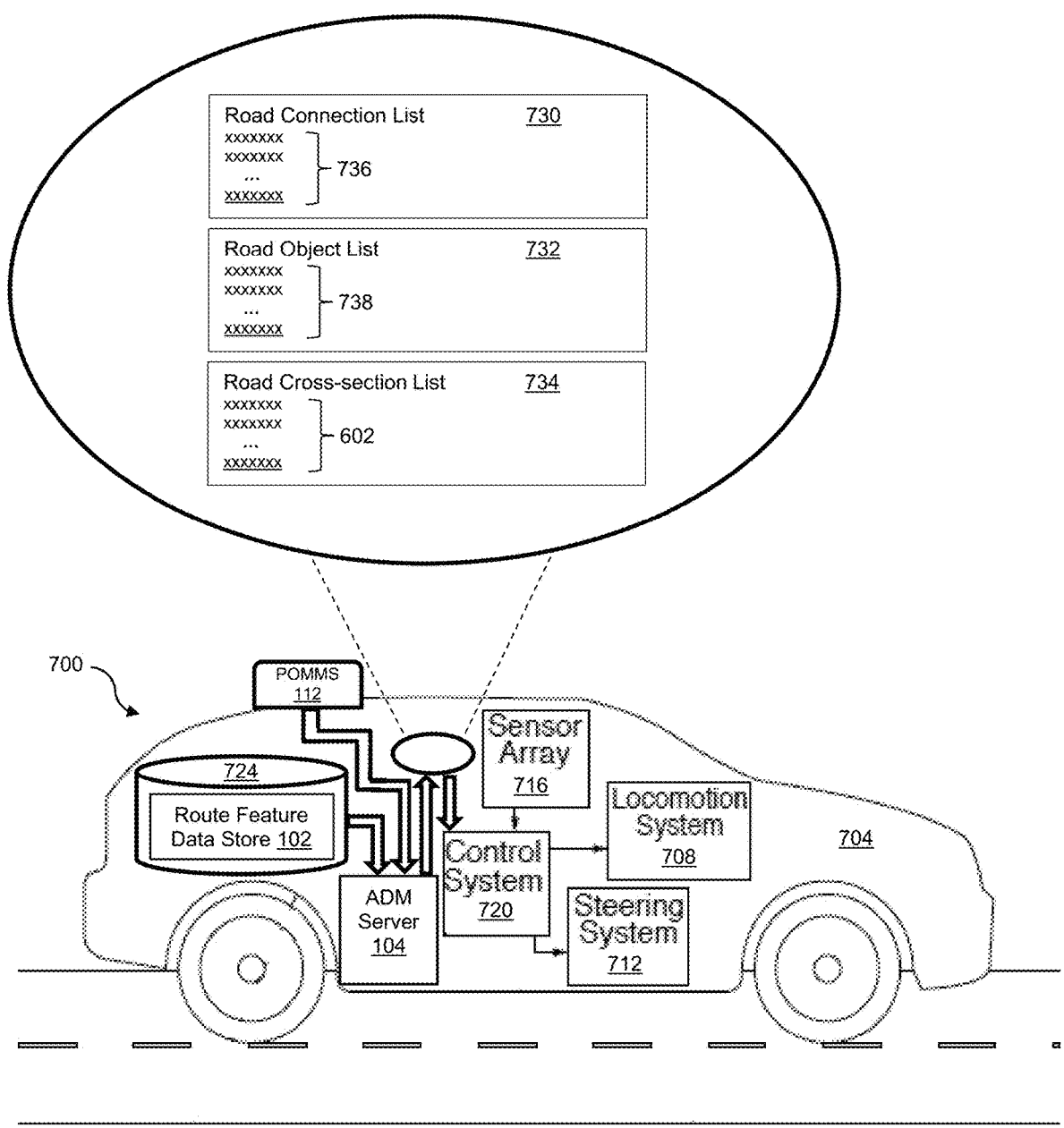
FIG. 7 is a schematic illustration of an exemplary self-driving road vehicle using an active driving map according to the present disclosure.

The provision of a periodically updated sequential series of road cross-section data objects and road connection data objects represents a "view" ahead of the vehicle along the route for use by the vehicle control system. Reference is now made to FIG. 7, in which an exemplary self-driving road vehicle is indicated generally at 700. The self-driving road vehicle 700 is shown schematically, and various components and systems which are known in the art are omitted for brevity and simplicity of illustration.

The self-driving road vehicle 700 comprises a body 704, a locomotion system 708, a steering system 712, a sensor array 716 and a control system 720. The term "control system", is used in the broad sense, and may comprise a plurality of individual subsystems. For example, the control system 720 may comprise a subsystem for receiving and interpreting sensor data, a planning subsystem to determine a sequence of planned maneuvers, a vehicle control interface subsystem for converting planned maneuvers into steering, throttle and braking control signals/commands, among others. As such, the term "control system" is not intended to impute any particular architecture. The locomotion system 708 is coupled to the body 704 for accelerating, propelling and decelerating the self-driving road vehicle 700 along a roadway, and the steering system 712 is coupled to the body 704 for steering the self-driving road vehicle 700. The sensor array 716 and the control system 720 are both carried by the body 704; the sensor array 716 senses driving data and has a sensor range, that is, a range beyond which the sensor array 716 is unable to resolve useful data. The sensor array 716 may include, for example, radar, LIDAR, ultrasonic sensors, cameras (visual and/or thermal), gyroscopes, GPS receivers, inertial measurement systems, accelerometers, magnetometers and thermometers, among others. Thus, the sensor array 716 may include or be coupled to all or part of the POMMS 112.

The control system 720 is coupled to the sensor array 716 for receiving sensed driving data from the sensor array 716, and may also communicate with conventional vehicle components such as another onboard computer system, speedometer, odometer, engine management system, traction control system, antilock braking system, tire pressure sensors, rain sensors, etc. The control system 720 is also coupled to the locomotion system 708 and the steering system 712 for controlling those systems. A data storage module 724 is coupled to and accessible by the control system 720. The control system 720 may execute the server process 104 (FIG. 1A) and/or one or more of the client processes 110C, 110P (FIG. 1A), for example as subsystems of the control system 720, or they may execute on one or more other computer systems.

The data storage module 724 includes the route feature data store 102, which stores road connection data objects 736, road object data objects 738 and road cross-section data objects 602 for a road network (e.g. a city, a state/province, a country, etc.). The ADM server process 104 extracts from the route feature data store 102 those road connection data objects 736, road object data objects 738 and road cross-section data objects 602 that are relevant to the current route and organizes them into respective lists 730, 732, 734 for provision by to the client process(es) 110C, 110P (FIG. 1A). The lists 730, 732, 734 may contain data for the entire expected route (e.g. all of a particular country or state/province), or may be periodically updated based on location through a suitable wireless communication protocol.

The control system 720 is configured to use at least one of the lists 730, 732, 734 of road connection data objects 736, road object data objects 738 and road cross-section data objects 602, respectively, to adjust control of the locomotion system 708 and/or the steering system 712. In many cases, at least some members of the lists 730, 732, 734 correspond to terrestrial positions outside of the sensor range of the sensor array 716, and the control system 720 adjusts control of the locomotion system 708 and/or the steering system 712 based on information conveyed by particular members of the lists 730, 732, 734 while the positions of those members of the list in the terrestrial coordinate frame correspond to a terrestrial position outside of the sensor range of the sensor array 716.

As can be seen from the above description, the provision of a dynamically updated sequential series of road cross-ssection data objects and road connection data objects as described herein represents significantly more than merely using categories to organize, store and transmit information and organizing information through mathematical correlations. The provision of a dynamically updated sequential series of road cross-section data objects and road connection data objects as described herein are in fact an improvement to the technology of self-driving road vehicles, as they provide a compact and efficient data structure for providing a "view" ahead of the vehicle along the route for use by the vehicle control system. This facilitates the ability of the control system of a self-driving road vehicle to use sensor-independent roadway data in performing its functions. Moreover, the technology is applied by using a particular machine, namely a self-driving road vehicle. As such, the technology is confined to self-driving road vehicle applications.

While an exemplary embodiment implemented using C++ and SQLite with SpatiaLite extension has been described, this is merely one exemplary embodiment, and any suitable programming language and database format may be used to implement the systems and methods described herein. Similarly, it will be appreciated that the names/descriptions of data objects, classes, methods and the like described herein are merely for convenience of reference and ease of understanding, and that any arbitrary name may be assigned to data objects, classes, methods and the like which perform the functions described herein without departing from the scope of the present disclosure.

Certain currently preferred embodiments have been described by way of example. It will be apparent to persons skilled in the art that a number of variations and modifications can be made without departing from the scope of the claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding U.S. Provisional Application Ser. No. 62/454,379, filed Feb. 3, 2017, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A self-driving road vehicle, comprising:
    a body;
    a locomotion system coupled to the body for accelerating, propelling and decelerating the vehicle along a roadway;
    a steering system coupled to the body for steering the vehicle;
    a sensor array carried by the body for sensing driving data;
    a control system carried by the body, wherein:
        the control system is coupled to the sensor array for receiving sensed driving data from the sensor array;
        the control system is coupled to the locomotion system for controlling the locomotion system; and
        the control system is coupled to the steering system for controlling the steering system;
    an active driving map system accessible by the control system;
    the active driving map system having route feature data to provide to the control system, wherein the route feature data includes, for a plurality of road segments and a plurality of road intersections of a real-world roadway, a sequential series of road cross-section data objects corresponding to the real-world roadway;
    wherein each road cross-section data object comprises a side-to-side cross-sectional description of a road surface corresponding to a specific location on the real-world roadway.

2. The self-driving road vehicle of claim 1, wherein the active driving map system includes a server process to receive position, orientation, and motion measurement data for the vehicle, and wherein each road cross-section data object ahead of the vehicle has a driving distance to that road cross-section data object from the vehicle.

3. The self-driving road vehicle of claim 2, wherein the control system comprises at least one controlling client process coupled to the server process of the active driving map system and adapted to configure the behavior of the server process, wherein each controlling client process is mutually non-interfering with each other controlling client process.

4. The self-driving road vehicle of claim 3, wherein the control system comprises only a single controlling client process.

5. The self-driving road vehicle of claim 3, wherein the control system comprises at least one passive client process coupled to the server process of the active driving map system and adapted to receive route feature data from the server process.

6. The self-driving road vehicle of claim 1, wherein the active driving map system also has road connection data objects to provide to the control system.

7. The self-driving road vehicle of claim 1, wherein the active driving map system also has road object data objects to provide to the control system, wherein the road object data objects are selected from the group consisting of traffic signals, traffic regulation signs, pedestrian crossings, stop bars, speed bumps, sign posts, entrances to overpasses, and potential vehicle collision locations in intersections.

8. The self-driving road vehicle of claim 1, wherein each of the sequential series of road cross-section data objects is defined by a notional plane perpendicular to a surface of the roadway.

9. The self-driving road vehicle of claim 1, wherein each of the sequential series of road cross-section data objects includes a position and an orientation.

10. The self-driving road vehicle of claim 2, wherein the active driving map system is accessible by the control system because the control system executes the server process of the active driving map system.

11. A method of operating a self-driving road vehicle, comprising:
    providing, to a control system of the self-driving vehicle, from an active driving map system accessible by the control system, route feature data including, for a plurality of road segments and a plurality of road intersections of a real-world roadway, a sequential series of road cross-section data objects corresponding to the real-world roadway;
    wherein each road cross-section data object comprises a side-to-side cross-sectional description of a road surface corresponding to a specific location on the real-world roadway.

12. The method of claim 11, wherein the active driving map system receives position, orientation, and motion measurement data for the vehicle, and wherein each road cross-section data object ahead of the vehicle has a driving distance to that road cross-section data object from the vehicle.

13. The method of claim 11, wherein the control system comprises at least one controlling client process coupled to a server process of the active driving map system and adapted to configure the behavior of the server process, wherein each controlling client process is mutually non-interfering with each other controlling client process.

14. The method of claim 13, wherein the control system comprises only a single controlling client process.

15. The method of claim 13, wherein the control system comprises at least one passive client process coupled to the server process of the active driving map system and adapted to receive route feature data from the server process.

16. The method of claim 11, wherein the active driving map system also has road connection data objects to provide to the control system.

17. The method of claim 11, wherein the active driving map system also has road object data objects to provide to the control system, wherein the road object data objects are selected from the group consisting of traffic signals, traffic regulation signs, pedestrian crossings, stop bars, speed bumps, sign posts, entrances to overpasses, and potential vehicle collision locations in intersections.

18. The method of claim 11, wherein each of the sequential series of road cross-section data objects is defined by a notional plane perpendicular to a surface of the roadway.

19. The method of claim 11, wherein each of the sequential series of road cross-section data objects includes a position and an orientation.

20. The method of claim 12, wherein the active driving map system is accessible by the control system because the control system executes the server process of the active driving map system.

21. A self-driving road vehicle, comprising:
a body;
a locomotion system coupled to the body for accelerating, propelling and decelerating the vehicle along a roadway;
a steering system coupled to the body for steering the vehicle;
a sensor array carried by the body for sensing driving data;
a control system carried by the body, wherein:
the control system is coupled to the sensor array for receiving sensed driving data from the sensor array;
the control system is coupled to the locomotion system for controlling the locomotion system; and
the control system is coupled to the steering system for controlling the steering system;
an active driving map system accessible by the control system;
the active driving map system having route feature data to provide to the control system;
wherein the route feature data includes a sequential series of road cross-section data objects corresponding to a real-world roadway.

22. The self-driving road vehicle of claim 21, wherein the active driving map system is accessible by the control system because the control system executes a server process of the active driving map system.

23. A self-driving road vehicle, comprising:
a body;
a locomotion system coupled to the body for accelerating, propelling and decelerating the vehicle along a roadway;
a steering system coupled to the body for steering the vehicle;
a sensor array carried by the body for sensing driving data;
a control system carried by the body, wherein:
the control system is coupled to the sensor array for receiving sensed driving data from the sensor array;
the control system is coupled to the locomotion system for controlling the locomotion system; and
the control system is coupled to the steering system for controlling the steering system;
an active driving map system accessible by the control system;
the active driving map system having route feature data to provide to the control system;
the active driving map system comprising a server process communicatively coupled to at least one client process.

24. The self-driving road vehicle of claim 23, wherein the active driving map system comprises at least one controlling client process coupled to the server process and adapted to configure the behavior of the server process, wherein each controlling client process is mutually non-interfering with each other controlling client process.

25. The self-driving road vehicle of claim 24, wherein the active driving map system comprises only a single controlling client process.

26. The self-driving road vehicle of claim 24, wherein the active driving map system comprises at least one passive client process coupled to the server process of the active driving map system and adapted to receive route feature data from the server process.

27. The self-driving road vehicle of claim 23, wherein the active driving map system is accessible by the control system because the control system executes the server process of the active driving map system.

* * * * *